United States Patent [19]

Focht

[11] 4,121,960
[45] Oct. 24, 1978

[54] PERFORATED, EMBOSSED FILM TO FOAM LAMINATES

[75] Inventor: Bruce E. Focht, Trainer, Pa.

[73] Assignee: Scott Paper Company, Philadelphia, Pa.

[21] Appl. No.: 743,416

[22] Filed: Nov. 19, 1976

Related U.S. Application Data

[60] Division of Ser. No. 583,799, Jun. 4, 1975, abandoned, which is a continuation-in-part of Ser. No. 476,216, Jun. 4, 1974, abandoned.

[51] Int. Cl.² .............................................. B32B 3/24
[52] U.S. Cl. ........................................ 156/219; 156/253
[58] Field of Search ............... 156/253, 219, 220, 209, 156/428, 252; 181/33 GA, 296; 428/138, 159, 158, 160, 161, 321

[56] References Cited

U.S. PATENT DOCUMENTS

| 3,292,619 | 12/1966 | Egler | 428/138 X |
| 3,579,540 | 5/1971 | Ohlhausen | 428/429 X |

FOREIGN PATENT DOCUMENTS 721,251  11/1965  Canada ..................................... 428/138
1,018,841  2/1966  United Kingdom ..................... 156/219

*Primary Examiner*—William A. Powell
*Assistant Examiner*—William H. Thrower
*Attorney, Agent, or Firm*—Nicholas J. DeBenedictis; John W. Kane, Jr.

[57] ABSTRACT

An embossed film-to-foam laminate is provided having minute perforations through the film selectively distributed essentially along the sidewalls and valleys of the embossed pattern. The integrity of the laminated film material is retained on the crowns of the embossed patterned surface, since the perforations in the film material are mainly distributed on the sidewalls and valleys of the embossed pattern. The laminated product has a water-resistant and abrasion-resistant upper surface imparted by the film material on the crowns while the small perforations in the sidewalls and valleys permit sound to pass through the film and be exposed to the acoustical matrix of the open cell foam component of the laminate while impeding the penetration of liquids (e.g. water) through the film into the foam under the action of gravity. The film and/or the foam material are heated to supply adhesive material by melting or softening which serves to bond the film material to the foam.

5 Claims, 5 Drawing Figures

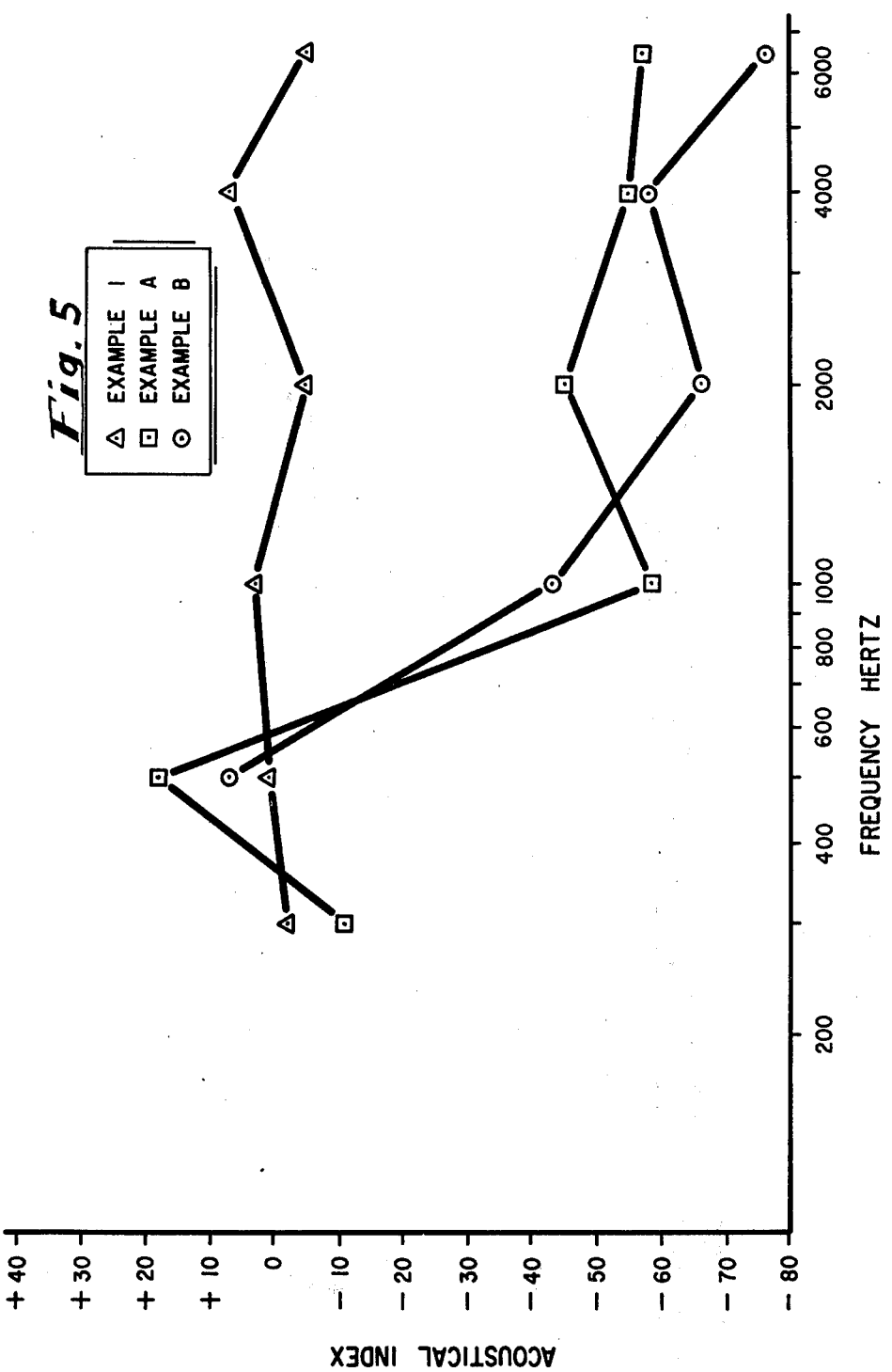

PERFORATED, EMBOSSED FILM TO FOAM LAMINATES

RELATED APPLICATIONS

This is a division, of application Ser. No. 583,799 filed June 4, 1975, now abandoned, which is a continuation-in-part of U.S. Ser. No. 476,216 filed June 4, 1974, now abandoned.

BACKGROUND OF THE INVENTION

1. Field of the Invention

This invention concerns embossed film-to-foam laminate.

2. Description of the Prior Art

Flexible, open cell foam is known to have good acoustical properties. For many uses of such acoustical foam, such as wall panels, increased durability and aesthetics are desired. Previous attempts to increase the durability and abrasion resistance of acoustical foam included laminating a protective sheet to the surface of the foam. However, the placing of a protective sheet in front of a good sound absorbing foam significantly impaired the sound absorbing properties of the acoustical foam. Examples of foam-to-sheet laminates are contained in U.S. Pat. No. 3,454,413, issued July 8, 1969 to Philip Miller and U.S. Pat. No. 3,425,882, issued Feb. 4, 1969 to Albert L. McConnell et al. In addition to laminating a cover sheet to the foam, such processes also imparted an embossed pattern to foam by a procedure known as "masking" during heat lamination. However, the sheet material was not adhered to the foam at many locations because of the presence of a masking fluid. The abrasion resistance of such a laminate is much less because of the absence of adhesive in parts of the embossed pattern.

Prior art relating to embossed, perforated laminates but not concerning laminates having an acoustical foam backing is disclosed in U.S. Pat. No. 3,292,619. Also, embossed foam rubber-to-foam laminates are disclosed in U.S. Pat. No. 2,752,279. However, in that disclosure the perforations continue through the foam with the sidewalls of the perforations covered by the film thereby impeding sound penetration into the foam.

SUMMARY OF THE INVENTION

A perforated and embossed film-to-foam acoustical product is provided comprising a protective film embossed and laminated to an acoustical foam backing. The embossed pattern is composed of crowns, valleys, and sidewalls connecting the crowns and valleys. The upper surface of the acoustical foam is contoured according to the embossed pattern and the protective film is adhesively attached to the upper surface of the acoustical foam and conforms to the embossed pattern. The film material is perforated essentially on the sidewalls and valleys of the embossed pattern while the top surface of the laminate defined by the crowns of the embossed pattern is substantially impervious to liquids and resists abrasion because the film on the crowns is essentially without perforations and adhesively attached to the acoustical foam backing. The embossed surface of the laminate is substantially opened by the perforations to provide good acoustical properties but because of the small size of the perforations and their location predominately in the sidewalls and valleys, the embossed surface does not appear to have perforations. Accordingly, acoustical properties are achieved without the product having the usual acoustical appearance. A hydrophobic liquid is preferably coated on the surface of the film which enhances the water resistance of the laminate and also masks imperfections in the manufacturing process. The laminate also exhibits an aesthetically self healing ability in which tears and punctures tend to be invisible. Preferably, the film is heat-deformed to generally contour to the cellular surface structure of the foam, especially on the crowns of the embossed pattern. The depth of the valleys is substantially less than the foam thickness, usually from 1/20 to ¼ of the foam thickness. The laminate is useful as a sound absorbing surface such as a wall panel, a headliner in motor vehicle or airplane passenger compartments, or in similar uses requiring an acoustical surface that is abrasion resistant and has an upper surface that is cleanable with liquids such as wall or ceiling panels in an elevator.

BRIEF DESCRIPTION OF THE DRAWINGS

FIG. 5 graphically depicts data contained in Table II.

DESCRIPTION OF THE PREFERRED EMBODIMENT OF THE INVENTION

Figure 1:
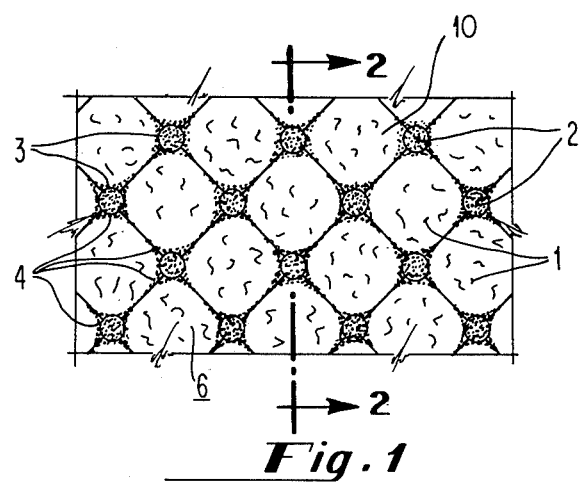
FIG. 1 is a top view of the laminated product.

The perforated, embossed, acoustical laminate can be produced by a process comprising the steps of contacting a deformable film with a surface of an open cell acoustical foam, adhesively activating with heat either the film or the surface of the foam, mechanically pressing and embossing the deformable film at an elevated temperature and pressure into the surface of the foam in a predetermined embossing pattern and setting the adhesive film and/or foam material by cooling to bond the laminate (usually accomplished when the laminate cools to about room temperature after embossing). The parameters of temperature, pressure and time (duration of the embossing or mechanical pressing) are controlled to obtain the required perforations. Specific values for the temperature, pressure and time depend upon the specific materials selected for the foam and film and the thickness of the film selected.

Any flexible open cell foam material may be employed in practicing this invention and preferably can be adhesively activated upon exposure to heat, including both foam type thermoplastic resins and foam type elastomers. Examples of such suitable open cell foams are polyether or polyester based urethane foams and foams from vinyl polymers such as polyvinyl chloride and its copolymers. Many different types of flexible open cell foams having acoustical properties are known and the selection of any particular one is not critical to the practice of this invention and well within the abilities of those possessing ordinary skill in the foam art.

The thickness, density, cell pore size and degree of cell openness of the foam are capable of wide variations with the selection of specific values for these parameters being dictated by the desired end use of the product with specific emphasis upon the acoustical properties desired. Particularly preferred are acoustically controlled foams such as flexible, open cell polyurethane foams especially those having a pore size from 10 to 90 PPI and a density from 1.5 to 6 lbs./ft.$^3$.

The film material can be any deformable nonwoven substantially water impenetrable film such as a plastic sheet or even a metal foil such as aluminum foil. The selection of a specific film material in combination with the thickness of the film sheet must be such that the film will deform and perforate under the mechanical pressure and elevated temperature encountered in the embossing step. Suitable film material include any of the well-known thermoplastic and thermoset film forming materials that can be mechanically and/or thermally deformed into the valley areas of the embossed pattern and which preferably soften sufficiently during embossing to adhesively bond to the foam. Examples of suitable thermoplastic film materials are natural substances such as crude rubber and synthetic materials such as polyvinyl chloride, nylons, fluorocarbons, linear polyethylene, polyurethane prepolymer, polystyrene, polypropylene, cellulose acetate, cellulose nitrate and acrylic resin. Thermoset materials undergo some softening under mild heating prior to thermosetting or rigidification (usually caused by cross-linking) and are therefore suitable. Precautions should be taken to prevent thermoset material from setting prior to embossing (which can be easily controlled by adjusting embossing temperature and time). Examples of suitable thermoset film materials are polyesters such as MYLAR ®, amino resins and silicones. Metal foils are also sufficiently deformable to be suitable for use as the film material especially the metals which soften more readily when exposed to heat such as aluminum, aluminum alloy, tin and tin alloys. Preferred film materials are polyesters, polyethylene, polyvinyl chloride, polypropylene, polyurethane, cellulose acetate, cellulose nitrate polystyrene and similar elastomeric materials. Particularly preferred is polyurethane film.

The sheet of deformable film material can vary in thickness with the selection of any particular thickness depending upon considerations such as the durability and cleanability of the laminate surface desired, the plasticity of the material selected at elevated temperatures and the malleability of the material selected. The embossing of the deformable film material into the valleys of the foam is accomplished by mechanically impressing the embossed pattern into the sheet material and foam simultaneously at elevated temperatures. In this way, the film material is both mechanically and thermally deformed into the valley areas during embossing which, for practical and economic considerations, dictates a thin film thickness which facilitates the mechanical deforming of the film during embossing at the slight elevated embossing temperatures employed. This practical thickness varies depending upon the film material selected and would usually be in the area of a fraction of a mil (e.g., 1/10 mil) to about 20 mils thick with from about 3 to about 8 mils preferred.

Normally, when placing such a film surface in front of a good sound absorber such as the flexible open cell foam material employed, the good sound absorbing properties of the open cell foam is significantly reduced. This reduction in good sound absorbency is substantially eliminated by the present invention as shown in FIG. 5.

The embossing pattern can vary greatly, it being only necessary that the pattern contain crowns and valleys interconnected by sloping sidewalls with the depth of valleys and the slopes of sidewalls being sufficient to cause the film material to achieve the required degree of perforation during the embossing step. Specific depths and slope angles can vary significantly because particular selections which will result in perforations during embossing are interdependent with other parameters such as thickness and malleability of the film material employed, the temperature of the film material achieved during embossing, the speed and the mechanical pressure of the embossing rolls because all of these parameters affect the perforations obtained during embossing. Those possessing ordinary skill in the art and enlightened by the present disclosure could readily select among these parameters an operable combination of embossing pattern, sheet material, foam, embossing temperature, speed and pressure that will result in the perforations predominantly on sidewalls and valleys of the laminated product. Higher embossing temperatures will also thermo-deform the sheet material and/or the foam to cause the film material to contour to the cellular structure defining the surface of the foam. Specific combinations of embossing patterns, embossing depth, embossing temperature, film material and thickness are demonstrated in the examples.

The process parameters that can be used to control the embossing process including the approximate size and number of perforations in the sidewalls and valleys are; (1) the mechanical pressure inserted on the film and the foam; (2) embossing time (duration of embossing pressure); (3) embossing pressure; (4) film material characteristics; (5) foam material characteristics; (6) embossing pattern characteristics; (7) embossing temperature; and (8) embossing release agents, lubricants, and similar aids.

The interaction of the above parameters can be adjusted to produce a laminate of the present invention. Furthermore, many of the process parameters are interrelated and adjustments upon one parameter can be used to affect another parameter. Obviously, embossing time and embossing temperature are related in that higher embossing temperatures usually permit shorter embossing times with other parameters held constant. Likewise higher embossing pressures normally permit lower embossing temperatures or the same embossing temperature when thicker film materials or less malleable film materials are used or when thicker less flexible foam materials are used. Deep embossing patterns usually require higher temperatures, higher pressures and/or longer embossing times. With other parameters held constant deeper embossing patterns tend to result in larger perforations, likewise higher embossing temperatures or embossing pressures also tend to increase the size of the perforations.

For most materials embossing temperatures from about ambient conditions to about 600° F are suitable with embossing temperatures of from about 450° F to about 550° F preferred with polyurethane film embossed onto polyurethane foam. Embossing pressures are usually not measured directly but specified in terms of the gap between the embossing roll and the back-up roll shown in FIG. 4 (items 7 and 8). This gap which results in the embossing pressure when the film and foam are fed between the rollers can vary from a gap of about 0 (the rollers just touching) to a gap of about 80% of the foam thickness. With one inch thick polyurethane foam and 3.5 mil thick polyurethane film a gap of approximately 0.120 inches is preferred with a gap of from about 8% to about 20% of the foam thickness being quite suitable, especially in combination with peripheral speeds for the embossing roll of from about 8 ft/min. to about 100 ft/min. (foam speed through the gap).

Figure 4:
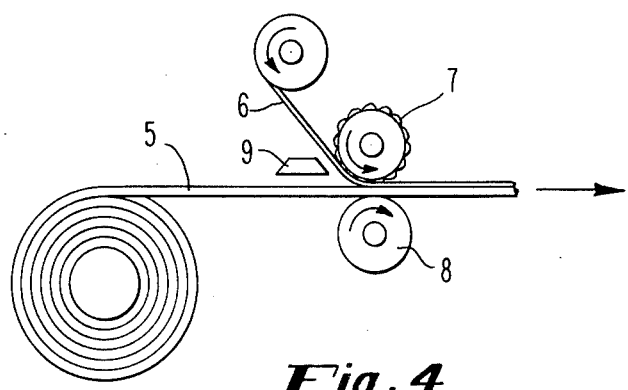
FIG. 4 schematically depicts a process for producing the product of FIG. 1.

Embossing release agents, lubricants and similar aids can be applied directly to the embossing roll 7 shown in FIG. 4 or they can be applied to the upper surface of the film material 6 before, during or after lamination. When a release agent such as dimethyl siloxane is applied directly to the embossing roll 7 it aids in the embossing process and release of the resulting laminate from the roll. In addition, a release agent can also result in a slight gloss to the laminated surface which masks manufacturing irregularities in the product. Furthermore, the lubricating and release agents are hydrophobic and a coating of such agents on the embossed surface increases the hydrophobisity of the laminated surface and results in water beading on the surface rather than passing through the perforations. In addition to dimethyl siloxane there are many other known release agents and lubricants which could be used such as the many well known fluorocarbon release agents, light oils such as machine oils and the like. Preferred are the hydrophobic lubricants and release agents such as dimethyl siloxane fluorocarbons, light petroleum oils, silicone oils and the like.

The eight parameters discussed above can be controlled in the process of making the laminate so that the resulting laminate has perforations mainly in the valley and sidewall areas. In order for the laminates to have good acoustics the size (width) of the holes (perforations) should be from about 1/50 of an inch to about 1/500 of an inch across. Since the holes vary in size and configuration including shapes such as circles, ellipses and slits, their size (width) is measured in terms of the longest dimension across the hole or perforation. A more accurate determination of pore size with respect to the functionality of the product in terms of acoustics can be determined by measuring the permeability of the resulting laminate. The process parameters discussed above should be adjusted particularly the embossing time, temperature, and pressure and the depth of the valleys in the embossing pattern so that the size and number of perforations are sufficient to produce a permeability of the laminate of from about 3 cubic feet per minute per square foot ($ft^3$/min. $ft^2$) to about 100 cubic feet per square foot as measured on the Frazier High Pressure Differential Air Permeability Machine when operated according to the U.S. Department of Commerce-National Bureau of Standards Research Paper RP1471 as published in Part of Journal of Research of the National Bureau of Standards, Volume 28, May 1942 in an article entitled "Improved Instrument for Measuring the Air Permeability of Fabrics", authored by Herbert F. Schiefer and Paul M. Boyland and operated at ½ inch liquid pressure level and with the sample clamped with sufficient pressure to compress the perimeter of the test sample to prevent by-pass of the air flow (usually a pressure sufficient to compress the foam from about 50% to about 75% of its origianl height). When the film material (which prior to embossing had a permeability of essentially 0) has sufficient perforations in it so that resulting laminate has a permeability of from about 3 to about 100 $ft^3$/min. $ft^2$ then the laminated surface is sufficiently opened to permit sound to pass through and be exposed to the acoustical matrix of the foam backing. When the holes also number from 30 to 1500 per square inch, the laminate is water resistant. Preferred is a permeability of from about 10 to about 30 $ft^3$/min. $ft^2$.

Measurement of the permeability of the laminated surface by directing air through a laminated surface and through the foam according to the Frazier test determines both the effectiveness of the size of the pores and the number of the pores in the laminated product since the air flow through the laminated surface must flow through the pores embossed into the film during lamination.

The laminate also has the advantageous characteristic of being aesthetically self healing. When the laminated surface is torn, such as when a jagged instrument is pulled across the laminated surface, the surface tends to rip and tear predominantly in the sidewalls and valleys of the embossed pattern which is relatively weaker than the crowns.

A continuous pattern of sidewalls and valleys defining discrete discontinuance crown areas in the embossed pattern is depicted in FIG. 1. Because of the numerous perforations through the film located in the sidewall and valley areas, the sidewalls and valleys are substantially weaker than the crown areas of the laminated surface. Tearing of the laminated surface tends to occur along the sidewall and valley portions of the embossed pattern. Because of the flexible foam backing, the laminated surface tends to return to its shape prior to tearing and since the tears are predominately located in the sidewalls and valleys they are hardly noticeable. Accordingly, a jagged tear through the laminated surface and into the flexible foam becomes essentially invisible when viewed by an unaided eye at a viewing distance of one foot from the laminated surface after the laminated surface has returned to its configuration prior to tearing. This aspect of the laminated product is referred to herein as aesthetically self healing and is believed to be due to the "elastomeric memory" of the laminate caused by the combination of a flexible foam and a flexible film denser than the foam.

The novel and advantageous characteristics of the embossed laminate provided by this invention can be best understood with reference to the figures. FIG. 1 is a plan view of the laminated surface and shows the crown area 1 of the embossed pattern, surrounded by the pattern formed by the deep recesses (valleys) 2 and the sidewalls 3. The perforations 4 are shown on the sidewalls and valleys. The film 6 is shown with the textured or patterned effect 10 on the crowns 1 caused by the deforming of the film to the cellular structure of the foam (the aspect is optional).

Figure 2:
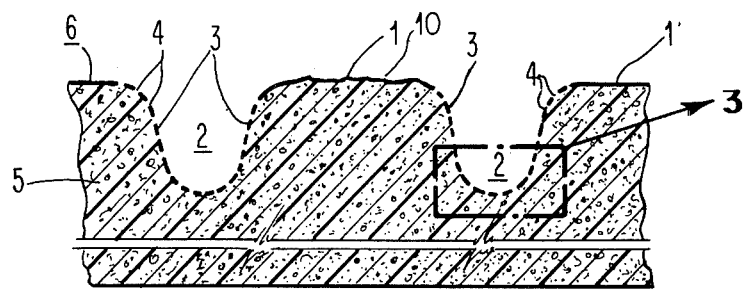
FIG. 2 is a sectional view along line 2—2 of the product of FIG. 1.

FIG. 2 is a sectional view along line 2—2 of the laminated product shown in FIG. 1 and shows a sideview of the laminate. The valleys of the embossed pattern 2 and their depth below the crowns 1 can be seen in this view. The steep slope of the sidewall 3 is also shown, which is a preferred embodiment for the embossing pattern because steep long sidewalls increase the amount of stretching and deformation the film undergoes during embossing which increases the tearing and perforations of the film along the sidewalls and valleys. Despite the tearing and perforating of the film, structural integrity is maintained on the crowns. This results in weakened areas selectively located in the valleys and sidewalls of the laminates. The perforations 4 are randomly dispersed on the sidewalls and valleys of the embossed pattern impressed into the foam 5. The upper surface of the foam and the film 6 defined by the crowns is water resistant because essentially all of the perforations are on the sidewalls and valleys. Furthermore, the small invisible size of the perforations in the sidewalls and valleys in combination with the use of silicone oils or other hydrophobic lubricants coated on the laminated surface makes the perforated portion of the laminated surface resistant to water penetration. In addition, the presence of the oily lubricant on the laminated surface masks minor imperfections and irregularities in the laminated surface which may occur during manufacture.

The perforations in the sidewalls and valleys are numerous and small which result in sufficient porosity of the laminated surface to give good sound absorbency but does not result in the usual appearance of acoustical products which contain large holes. The small size of and the perforations also permit a cleanable water resistant surface.

The perforations are larger than the micropores found in synthetic leather products (poromerics) and smaller than macropores. Macropores being defined as pores of sufficient diameter which overcome capillary action and permit water to pass through under the influence of gravity. The perforations through the valley and sidewall areas of the present invention generally vary in size (width) from about 1/50 of an inch to about 1/400 of an inch. Such pore sizes are relatively small compared to the holes normally encountered in acoustical panels and because of their location predominantly in the sidewall and valley areas they are invisible to the unaided eye when viewed at a distance of one foot or greater. Accordingly the aesthetic aspects of the product have been freed from the necessity of having larger visible holes.

Figure 3:
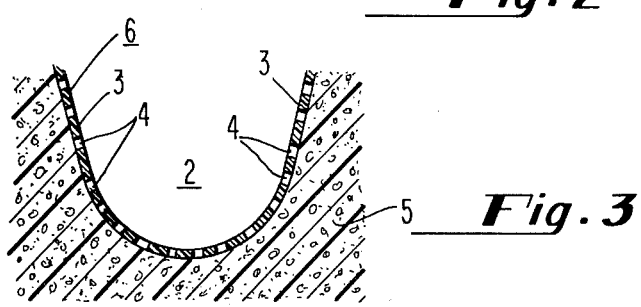
FIG. 3 is an enlargement of the valley and its adjoining sidewalls of the embossed pattern shown in block 2 of FIG. 2.

FIG. 3 is an enlargement of the area shown in box 2 of FIG. 2 and clearly shows the perforations 4 on the sidewalls and valleys.

FIG. 4 depicts a process for producing the laminate in which foam 5 is fed from a roll past a heat source 9 and through embossing roll 7 and back-up roll 8. The plastic film 6 is fed from a roller through the embossing rolls 7 and 8 while contacting the top surface of the foam. The desired pattern to be embossed is reproduced on the upper embossing roller 7 but in reverse (the valleys of the embossing pattern correspond to crowns on the embossing roller). A heat source 9 adhesively activates the top surface of the foam and/or the lower surface of the film. The heat source could be the embossing roller 7 itself. Thermodeformable film will contour to the cellular structure of the foam during the embossing step which produces a slight irregularity to the film surface particularly noticeable on the crowns as seen in FIG. 1, item 10. The peripheral speed of embossing roller 7 is preferrably from about 8 ft/min. to about 100 ft/min. When embossing roller is used as the heat source it is preferably heated to a temperature of from about 400° F. to about 600° F. A hydrophobic lubricant and release agent is preferably applied to roller 7 which results in the coating of the film during embossing.

FIG. 5 graphically compares the present invention with plain foam to film laminates (smooth) and foam to film embossed laminates but without perforations (perforations masked with paint).

EXAMPLE I

A 70 per inch (ppi) flexible open cell polyurethane foam sheet about 1 inch thick was passed through embossing rolls as shown in FIG. 4 at a speed of about 35 feet per minute (peripheral speed of roller 7). Simultaneously, a sheet of 4 mil thick TUFTANE ® film (a polyester based urethane film having a specific gravity of 1.21 and containing antioxidant and ultraviolet stabilizers sold by B. F. Goodrich Chemical Company as TF-312) was fed through the embossing rolls while contacting the top surface of the foam. The upper embossing roll 7 was heated to a temperature of about 480° F. and had a contoured surface so as to emboss a rosette pattern into the film and foam. The contour pattern on the roller consisted of about 25 protrusions per square inch having a depth of about 0.06 inches (hill to valley), and protrusions comprising approximately about 5% of the surface area of the roll and impress a corresponding depression or valley into the film and foam during embossing. The resulting embossed laminate had a tough flexible top surface comprising the TUFTANE ® film strongly bonded to the foam material and containing perforations essentially along the sidewalls and valleys of the embossed pattern impressed into the laminate by the upper embossing roll. The perforations numbered about 250 to 350 per square inch and were mostly visible with light transmitted through the laminated surface but were invisible with reflected light and were at a distance of one foot. The upper surface of the laminate defined by the crowns of the embossed pattern was abrasion resistant and water-resistant (it could be wiper vigorously with a wet cloth along the upper surface defined by the crowns without significant penetration of water into the foam). The acoustical properties of the foam base (reverse side of the product) and the acoustical properties of the embossed and perforated laminated surface of the product were tested according to ASTM Test C-384-58 entitled "Standard Method of Test for Impedance and Adsorption of Acoustical Materials by the Tube Method" at frequencies of 0.3, 0.5, 1.0, 2.0, 4.0 and 6.4 Kilo Hertz. Results of the tests are listed in Tables I and II and are reported as per cent acoustical adsorption (Table I) and acoustical index (Table II). This test and the acoustical adsorption of the material is mainly a surface phenomenon and, therefore, the acoustical properties of both the laminate side and the base foam side of the product were tested employing a single sample of the laminated product and first testing the embossed and perforated laminated side and then reversing the product to test the acoustical properties of the foam base. This procedure insured that the acoustical test data for the foam based eliminated any difference or variations in the acoustical properties of the foam from one section of a sheet to another section of the sheet. The laminate of Example I was torn along the laminated surface with a screw driver and was punctured with a pencil. The tear and puncture holes were essentially invisible after the laminated surface was smoothed by hand.

EXAMPLES 2-10

The procedure of Example 1 was repeated with different foam backing materials and different film materials. Examples 2-10 differ from Example 1 in the following aspects: the pore size of the foam was changed in Examples 2 and 3 from 70 ppi. to 60 ppi. (Example 2) and 50 ppi. (Example 3); Examples 4, 5, and 7 duplicate Example 1 and are intended to show that while absolute values and acoustical absorption may vary due to differences between foam examples, the acoustical index is consistently comparable and, therefore, the experimental data is significant. Example 8 employs foam differing from the foam of Example 1 in that the foam was treated prior to embossing according to a process that fully reticulated the foam (dewindowed) but retained the 70 ppi. pore size, Example 9 employed the same foam as Example 1 but used a ½ mil thick smooth aluminum foil as the deformable film material; Example 10 employed a ½ mil thick texturized aluminum foil as the deformable film material.

The acoustical performance of the embossed and perforated laminate of Examples 1-10 is reported in Tables I and II.

The data reported as Example 6 is a repeat of Example 3.

Comparative Examples

Comparative Example A employed the same foam and film material of Example 1 but the laminated product was produced by smooth rolls rather than employing an upper embossing roll. This produced a nonembossed, nonperforated laminate with the TUFTANE ® film material conforming to the cellular structure of and adhesively attached to the foam material. Comparative Example B employed the same foam and film material and the same embossing rolls as Example 1. However, the embossed laminate product of Comparative Example B differed from the product of Example 1 in the absence of perforations. In order to exactly duplicate the embossing pattern with the same materials of Example 1, the perforations could not be avoided even with adjustments in the thickness of the film material and the temperature of the embossing roll and, therefore, in order to produce the nonperforated embossed laminate for Comparative B, the perforations were closed by painting the embossed surface of Comparative B (5 coats of paint required to close the perforations).

Example 11

The procedure of Example 1 was repeated with the same foam and film material but employing an embossing roll having a diamond type pattern consisting of elongated diamond shaped protrusions on the upper embossing roll having a height of 0.050 inches and spaced approximately 0.075 inches apart with approximately 27 protrusions per square inch of the embossing roll. The product was tested for its acoustical properties and the results reported in Table I.

Permeability tests were performed upon the laminates of Examples 1-11 and comparative Examples A and B according to the Frazier test described herein and the results are given in Table I. While Comparative B exhibited some permeability, it is believed to be due to some opening of the paint masks during testing and not due to acoustically functioning perforations as shown by the acoustical performance data.

The best mode presently contemplated for practicing the present invention is by embossing a polyurethane film about 5 mils thick to a flexible open cell polyurethane foam having a pore size of about 70 ppi. and a thickness of from about ⅛ inch to about 3 inches thick and employing an embossing pattern having a difference in height between valleys and crowns of about 0.060 inches and with a sufficient numer of crowns and valleys per square inch of laminated product to result in at least 10 and preferably between 30 and 1500 invisible perforations per square inch of product.

By invisible perforations as used herein, is meant perforations that cannot be seen with an unaided eye, except when the product is delaminated and the film is viewed with a light source on the opposite side of the viewer so as to highlight the perforations. Accordingly, the perforations are visible with light transmitted through the laminated rather than with reflected or incident light. Delamination facilitates the transmission of light through the laminated surface. The perponderance of the perforations in the laminates of Examples 1-11 were invisible.

Significance: The data reported in the Tables shows the acoustical performance of the present invention in that the acoustical benefits of the foam backing are essentially retained while a water and abrasion resistant top surface is provided which usually interferes with acoustical adsorption (see Comparative A). Table I contains the percent sound absorption at various frequencies in Kilo Hertz for both the foam backing and the laminated surface. In order to eliminate acoustical differences between apparently similar foams, an acoustical index was calculated from the sound adsorption data in Table I. The acoustical index equals the percent sound absorption of the foam backing minus the percent sound adsorption of the laminate surface. An acoustical index of zero indicates perfect reproduction of the acoustical properties of the foam backing while a negative index indicates a reduction in sound adsorption and a positive index indicates improvement.

TABLE I

| Example No. | Acoustical Properties - Frequency in kHz | | | | | | | | | | | | Permeability |
|---|---|---|---|---|---|---|---|---|---|---|---|---|---|
| | Base Foam | | | | | | Laminate | | | | | | |
| | 0.3 | 0.5 | 1.0 | 2.0 | 4.0 | 6.4 | 0.3 | 0.5 | 1.0 | 2.0 | 4.0 | 6.4 | |
| 1 | 18 | 25 | 68 | 98 | 76 | 94 | 16 | 26 | 71 | 93 | 83 | 89 | 30.6 |
| 2 | 15 | 22 | 53 | 98 | 72 | 95 | 18 | 26 | 65 | 98 | 75 | 93 | 35.3 |
| 3 | 13 | 21 | 60 | 96 | 82 | 91 | 15 | 22 | 64 | 96 | 84 | 96 | 31.6 |
| 4 | 21 | 35 | 85 | 83 | 84 | 88 | 22 | 33 | 83 | 77 | 85 | 89 | 10.5 |
| 5 | 16 | 26 | 71 | 96 | 76 | 89 | 20 | 30 | 74 | 94 | 77 | 87 | 22.7 |
| 6 | 13 | 21 | 60 | 96 | 82 | 91 | 15 | 22 | 64 | 96 | 84 | 96 | 31.6 |
| 7 | 19 | 28 | 92 | 71 | 70 | 80 | 25 | 45 | 89 | 80 | 72 | 70 | 22.7 |
| 8 | 12 | 12 | 16 | 26 | 52 | 52 | 15 | 20 | 34 | 60 | 73 | 47 | 99 |
| 9 | 15 | 30 | 73 | 70 | 44 | 48 | 30 | 64 | 61 | 37 | 56 | 42 | 10.5 |
| 10 | 14 | 22 | 49 | 95 | 75 | 98 | 23 | 33 | 76 | 85 | 68 | 69 | 21.9 |
| 11 | 15 | 22 | 50 | 90 | 74 | 95 | 24 | 28 | 63 | 95 | 75 | 98 | 46 |
| Comp. A | 22 | 38 | 86 | 95 | 77 | 78 | 11 | 56 | 28 | 40 | 22 | 21 | 0 |
| Comp. B | 19 | 26 | 63 | 99 | 82 | 96 | * | 33 | 20 | 33 | 25 | 20 | 3.87 |

TABLE II

| Example No. | ACOUSTICAL INDEX (Base Foam - Laminate) Frequency kHz | | | | | |
|---|---|---|---|---|---|---|
| | 0.3 | 0.5 | 1.0 | 2.0 | 4.0 | 6.4 |
| 1 | −2 | +1 | +3 | −5 | +7 | −5 |
| 2 | +3 | +4 | +12 | 0 | +3 | −2 |
| 3 | +2 | +1 | +4 | 0 | +2 | +5 |
| 4 | −1 | +2 | +2 | −6 | +1 | +1 |
| 5 | +4 | +4 | +3 | −2 | +1 | −2 |
| 6 | +2 | +1 | +4 | 0 | +2 | +5 |
| 7 | +6 | +17 | −3 | +9 | +2 | −10 |
| 8 | +3 | +8 | +18 | +34 | +21 | −5 |
| 9 | +15 | +34 | −12 | −33 | +12 | −6 |
| 10 | +8 | +11 | +27 | −10 | −7 | −29 |
| 11 | +9 | +6 | +13 | +5 | +1 | +3 |
| Comp. A | −11 | +18 | −58 | −45 | −55 | −57 |

TABLE II-continued

| Example No. | ACOUSTICAL INDEX (Base Foam - Laminate) Frequency kHz | | | | | |
|---|---|---|---|---|---|---|
| | 0.3 | 0.5 | 1.0 | 2.0 | 4.0 | 6.4 |
| Comp. B | * | +7 | −43 | −66 | −57 | −76 |

What is claimed is:

1. A method of producing a film-to-foam laminate comprising: contacting a deformable film material with a surface of an open-cell, flexible, acoustical, polyurethane foam, said film having a thickness of from 1/10 mil to 20 mils;

adhesively activating with heat the film material or the surface of the foam;

mechanically pressing and embossing the deformable film, at an elevated temperature and pressure, into the surface of the foam with a heated embossing roll having a predetermined embossing pattern of crowns, sidewalls and valleys;

controlling the duration of mechanical embossing, the elevated temperature and the elevated pressure to result in perforations through the film in the sidewalls and valleys caused by pressing the film into the surface of the foam, said controlling being achieved by maintaining the heated embossing roll at a temperature of from about 400° F to about 600° F and operating the roll at a peripheral speed of from about 8 ft/min. to about 100 ft/min., to result in perforations through the film material having a width of from about 1/50 of an inch to about 1/400 of an inch; and setting the adhesively activated material to result in the film-to-foam laminate.

2. The method of claim 1 wherein the duration of mechanical embossing, the temperature and the pressure are controlled to result in about 30 to about 1500 perforations per square inch of laminated surface of sufficient size to result in a porosity for the laminate of from about 3 ft$^3$/min.-ft$^2$ to about 100 ft$^3$/min.-ft$^2$.

3. The method of claim 1 wherein a hydrophobic lubricant and release agent is coated on the film.

4. The method of claim 3 wherein the hydrophobic lubricant and release agent is applied onto the heated embossing roll which contacts the film and coats the film with said agent during embossing.

5. The method of claim 3 wherein said agent is dimethyl siloxane.

* * * * *